US009665559B2

(12) United States Patent
Gross et al.

(10) Patent No.: US 9,665,559 B2
(45) Date of Patent: May 30, 2017

(54) WORD CHECKING TOOL FOR SELECTIVELY FILTERING TEXT DOCUMENTS FOR UNDESIRABLE OR INAPPROPRIATE CONTENT AS A FUNCTION OF TARGET AUDIENCE

(75) Inventors: John N. Gross, Woodside, CA (US); Anthony A. Gross, San Jose, CA (US)

(73) Assignee: Kinigos, LLC, Zephyr Cove, NV (US)

(*) Notice: Subject to any disclaimer, the term of this patent is extended or adjusted under 35 U.S.C. 154(b) by 1358 days.

(21) Appl. No.: 12/206,599

(22) Filed: Sep. 8, 2008

(65) Prior Publication Data

US 2009/0006950 A1 Jan. 1, 2009

Related U.S. Application Data

(63) Continuation of application No. 10/919,877, filed on Aug. 16, 2004, now Pat. No. 7,424,674, and a continuation of application No. 10/723,370, filed on Nov. 26, 2003, which is a continuation of application No. 09/014,414, filed on Jan. 27, 1998, now Pat. No.
(Continued)

(51) Int. Cl.
G06F 17/00 (2006.01)
G06F 17/27 (2006.01)
G06Q 10/10 (2012.01)
H04L 12/58 (2006.01)

(52) U.S. Cl.
CPC .......... *G06F 17/274* (2013.01); *G06F 17/273* (2013.01); *G06Q 10/107* (2013.01); *H04L 12/585* (2013.01); *H04L 12/5855* (2013.01); *H04L 51/12* (2013.01); *H04L 51/14* (2013.01)

(58) Field of Classification Search
CPC ... H04L 12/585; H04L 12/5855; H04L 51/12; H04L 51/14; H04L 51/583; H04L 51/063; H04L 51/58; G06Q 10/107; G06F 17/274; G06F 17/273; H04W 4/12
USPC ........ 715/200, 205, 234, 236, 257; 709/203, 709/206, 225, 207, 218; 707/E17.109, 707/999.102, 999.2
See application file for complete search history.

(56) References Cited

U.S. PATENT DOCUMENTS 4,456,973 A 6/1984 Carlgren et al.
4,674,065 A 6/1987 Lange et al.
(Continued)

FOREIGN PATENT DOCUMENTS

EP 0466516 A2 1/1992
JP 06119325 4/1994
(Continued)

OTHER PUBLICATIONS www.x-stop.com, screen captures from WayBack Machine (www.archive.org) of X-Stop web site, archived Apr. 14, 1997, 7 pages total.*

(Continued)

*Primary Examiner* — Cesar Paula
*Assistant Examiner* — James H Blackwell
(74) *Attorney, Agent, or Firm* — J. Nicholas Gross

(57) ABSTRACT

A word processing tool is disclosed for checking the substance and not merely the spelling of words provided by a user. The word checker is capable of identifying potentially inappropriate word choices so that unintentional errors are not introduced into electronic text documents. The word checker can be implemented as a stand-alone procedure, or integrated into a conventional spell-checking program.

18 Claims, 3 Drawing Sheets

Related U.S. Application Data 6,782,510, said application No. 10/919,877 is a continuation of application No. 09/014,414.

(56) References Cited

U.S. PATENT DOCUMENTS

| | | |
|---|---|---|
| 4,773,039 A | 9/1988 | Zamora |
| 4,818,131 A | 4/1989 | Sakai |
| 4,829,472 A | 5/1989 | McCourt et al. |
| 4,903,206 A | 2/1990 | Itoh et al. |
| 5,258,909 A | 11/1993 | Damerau et al. |
| 5,280,573 A | 1/1994 | Kuga et al. |
| 5,305,205 A | 4/1994 | Weber et al. |
| 5,349,648 A | 9/1994 | Handley |
| 5,367,453 A | 11/1994 | Capps et al. |
| 5,377,354 A | 12/1994 | Scannell et al. |
| 5,418,718 A | 5/1995 | Lim et al. |
| 5,428,778 A | 6/1995 | Brookes |
| 5,437,036 A | 7/1995 | Stamps et al. |
| 5,541,836 A | 7/1996 | Church et al. |
| 5,576,755 A | 11/1996 | Davis |
| 5,576,955 A | 11/1996 | Newbold et al. |
| 5,594,642 A | 1/1997 | Collins et al. |
| 5,604,897 A | 2/1997 | Travis |
| 5,619,648 A | 4/1997 | Canale et al. |
| 5,623,600 A | 4/1997 | Ji et al. |
| 5,649,222 A | 7/1997 | Mogilevsky |
| 5,678,041 A | 10/1997 | Baker et al. |
| 5,678,053 A | 10/1997 | Anderson |
| 5,696,898 A | 12/1997 | Baker et al. |
| 5,706,507 A * | 1/1998 | Schloss .................. 709/225 |
| 5,708,822 A | 1/1998 | Wical |
| 5,715,468 A | 2/1998 | Budzinski |
| 5,715,469 A | 2/1998 | Arning |
| 5,751,335 A | 5/1998 | Shintani |
| 5,754,939 A | 5/1998 | Herz et al. |
| 5,757,417 A | 5/1998 | Aras et al. |
| 5,761,689 A | 6/1998 | Rayson |
| 5,796,942 A | 8/1998 | Esbensen |
| 5,796,948 A * | 8/1998 | Cohen ..................... 709/206 |
| 5,812,863 A | 9/1998 | Ishikawa |
| 5,822,527 A * | 10/1998 | Post ........................ 709/206 |
| 5,832,212 A | 11/1998 | Cragun et al. |
| 5,835,722 A * | 11/1998 | Bradshaw et al. ........... 709/225 |
| 5,848,418 A | 12/1998 | de Souza et al. |
| 5,867,811 A | 2/1999 | O'Donoghue |
| 5,873,056 A | 2/1999 | Liddy et al. |
| 5,875,443 A | 2/1999 | Nielsen |
| 5,884,033 A | 3/1999 | Duvall et al. |
| 5,889,943 A | 3/1999 | Ji et al. |
| 5,890,182 A | 3/1999 | Yagisawa et al. |
| 5,903,867 A | 5/1999 | Watari et al. |
| 5,907,839 A | 5/1999 | Roth |
| 5,911,043 A | 6/1999 | Duffy et al. |
| 5,933,531 A | 8/1999 | Lorie |
| 5,956,739 A | 9/1999 | Golding et al. |
| 5,960,080 A | 9/1999 | Fahlman et al. |
| 5,973,683 A | 10/1999 | Cragun et al. |
| 5,996,011 A | 11/1999 | Humes |
| 5,999,896 A | 12/1999 | Richardson et al. |
| 5,999,932 A | 12/1999 | Paul |
| 6,002,997 A | 12/1999 | Tou |
| 6,012,075 A | 1/2000 | Fein et al. |
| 6,023,723 A | 2/2000 | McCormick et al. |
| 6,047,299 A | 4/2000 | Kaijima |
| 6,052,709 A | 4/2000 | Paul |
| 6,072,942 A | 6/2000 | Stockwell et al. |
| 6,073,142 A | 6/2000 | Geiger et al. |
| 6,075,550 A | 6/2000 | Lapierre |
| 6,078,733 A | 6/2000 | Osborne |
| 6,085,206 A | 7/2000 | Domini et al. |
| 6,092,101 A | 7/2000 | Birrell et al. |
| 6,126,306 A | 10/2000 | Ando |
| 6,146,026 A | 11/2000 | Ushiku |
| 6,151,598 A | 11/2000 | Shaw et al. |
| 6,154,757 A | 11/2000 | Krause et al. |
| 6,166,780 A | 12/2000 | Bray |
| 6,199,102 B1 * | 3/2001 | Cobb ....................... 709/206 |
| 6,266,664 B1 | 7/2001 | Russell-Falla et al. |
| 6,609,196 B1 | 8/2003 | Dickinson, III et al. |
| 6,675,162 B1 | 1/2004 | Russell-Falla et al. |

FOREIGN PATENT DOCUMENTS

| | | |
|---|---|---|
| JP | 06149879 | 5/1994 |
| JP | 07021184 | 1/1995 |
| JP | 07093330 | 4/1995 |
| JP | 07282047 | 10/1995 |
| JP | 10011438 | 1/1998 |

OTHER PUBLICATIONS

Camarda et al.,"Using Microsoft Word 97, Bestseller Edition," © 1997, QUE Corp., Chapter 4, pp. 124-139.*

Qualcomm,"Eudora Light, Version 3.0 for Windows, User Manual," © Mar. 1997, Qualcomm, 133 pages.*

Eudora Pro V 3 for Windows User Manual, obtained from <"http://www.yale.edu/dno/docs/eudora_docs/win/manual.pdf">, © 1996, Qualcomm, Inc., 206 pages.*

Camarda, B., "Using Microsoft Word 97, Bestseller Edition," 1997, pp. 124, 126-127, 369-370.

Camarda, B., "Using Microsoft Word 97, Bestseller Edition," 1997, pp. 125, 137-139, QUE Publishing.

Integralis, White Paper, MIMEsweeper, "Total Email Content Management Countering Email Borne Threats," www.mimesweeper.integralis.com, Jan. 1996, 12 pages.

Integralis, "MIMEsweeper Administrator's Guide," Functional Guide and Reference for MIMEsweeper Version 2.3, www.mimesweeper.integralis.com, 1996, 160 pages.

Schrader, A., "In Search of the Perfect Filter: Indexing Theory Implication for Internet Blocking and Rating Software," School of Library and Information Studies University of Albert, http://www.ualberta.ca/~aschrade/nl_cen2.htm, Jun. 1998, 14 pages.

Schrader, A., "Consumer Protection or Censorship Technlogies?," Presented at 1997 annual conference of the Canadian Library Association, http://www.ualberta.ca/~aschrade/nl_cen2.htm, Jun. 1997, 26 pages.

Cyber Snoop Release, "Pearl Software Introduces Cyber Snoop Version 2.07," Nov. 3, 1997, pp. 1-2, http://www.pearlsw.com/psnews/cs_rel.htm.

Learning Company Press Release, "Learning Company's Cyber Patrol® Product Selected by Microsoft Corporation as Exclusive Filtering Technology for Internet Explorer Plus to Protect Children," Oct. 29, 1997, pp. 1-3, http://www.learningco.com/news/news/971029.htm.

Microsystems Press Release, "Microsystems Answers Parents' Demands with Cyber Patrol version 3.0," Jun. 5, 1996, pp. 1-2, http://www.cyberpatrol.com/cyber/patrol/cpnews/pr96/CP3_PR.htm.

AUP Auction Tools Press Release, Jun. 27, 1997, 1 Page, http://www.aupaction.com/pr0627.html.

"Welcome to the Big Mouth Lion Webware Forum Manager," http://replay.waybackmachine.org|l997061906l4l7 /http://www.infohiway.com/bigmouthlion/, 1995, 2 pages.

Newsgroups: comp.Infosysterns.www.authorlng.cgi, May 16, 1996, 3 pages.

PR Newswire, "First Amendment Rights Not an Issue with Cyber Sentinel(TM); New Software Tool Puts Information Control Back in the Hands of Parents," Jul. 21, 1997, 2 pages.

"Questions and Answers for Cyber Patrol 3.0," http://replay.web.archive.org/l9961111041707/http://wvvw.microsys.com/cyber/cp3_qa.htm, 9 pages, 1996.

PR Newswire, "Kids and the Internet New Software Overcomes Parents' Fears of Easy On-line Access to Adult Material," Oct. 2, 1995, 2 pages.

Cybersitter, "The most advanced Internet filtering product available," http://classic-web.archive.org/web/19970415151645/solidoak.com/cysitter.htm, 1997, 2 pages.

(56) References Cited

OTHER PUBLICATIONS

Google Groups, http://groups.google.com/group/comp.bbs.majorbbs/msg/132, comp.bbs.majorbbs, Oct. 11, 1994, 4 pages.
Google Groups, Message from discussion Profanity Settings & Mr. D, comp.bbs.majorbbs, Nov. 23, 1994, 7 pages.
Google Groups, High Velocity Profanity C, comp.bbs.majorbbs, Dec. 16, 1994, 1 page.
Administrator's Guide Version 3.1, Integralis Technology, Revision 1.1, 1997, 402 pages.
For FireWall-1 Administrator's Guide Version 1.0, Integralis Technology, Revision 1.0, 1997, 136 pages.
Content security white paper, http://replay.waybackmachine.org/19980121131441/http://www.mimesweeper.integralis.com/product_info/cswp.htm, 1998, 13 pages.
Angus, Jeff;"Filter Info Fast," Information Week, May 5, 1997, 3 pages.
Avery, Mike; "MimeSweeper neatly cleans up e-mail, Web content," InfoWorld, Jun. 23, 1997, 2 pages.
PR Newswire, "Integralis Ships New Version of MIMEsweeper for Microsoft Windows NT 4.0," Dec. 4, 1996, 2 pages.
LexisNexis, "Control Data Goes for LDAP," Dec. 10, 1997, 1 page.
GreatCircle.com, Firewalls, Oct. 9, 1997, 2 pages.
LexisNexis, "Integralis Releases MIMEsweeper v2.3 With New E-mail Security Features; Extends beyond e-mail virus detection to include content management features," Aug. 28, 1996, 2 pages.
LexisNexis, "Integralis Ships New Version of MIMEsweeper for Microsoft Windows NT 4.0; MIMEsweeper v2.4 Increases Performance and Adds NT Services," Dec. 4, 1996.
Berghel, Hal; "Email—The Good, The Bad, and the Ugly," Communications of the ACM, Apr. 1997/vol. 40, No. 40, 5 pages.
LexisNexis, "Integralis' new MIMEsweeper v3.0 redefines Web/email security, delivers Internet content management," Feb. 19, 1997, 2 pages.
LexisNexis, "Integralis announces MIMEsweeper for NT Version 2.1 with Microsoft Mail support; Protects e-mail users against viruses and macro bombs originating from internal and Internet e-mail," Feb. 20, 1996, 2 pages.
LexisNexis, "Mimesweeper 3.0 for Web, E-Mail Security—More," Feb. 27, 1997, 2 pages.
Hubbard, S.D. et al.; "Firewalling the Net," BT Technology J vol. 15 No. 2 Apr. 1997, 13 pages.
LexisNexis, "Internet Mail Virus Software for cc:Mail and Internet Mail; Central House Distributes MIMEsweeper in US," Jan. 2, 1996, 2 pages.
LexisNexis, "Integralis releases MIMEsweeper Version 2.0 with SMTP mail security support; MIMEsweeper for Internet now protects all corporate LANs from viruses and macro bombs hidden in Internet e-mail," Jan. 15, 1996, 2 pages.
LexisNexis, "Integralis creates complete Lotus content scanning mail solution with MIMEsweeper for Lotus Notes and cc:Mail hub version," Jan. 27, 1997, 2 pages.
LexisNexis, "Integralis Lotus mail scanning solution with MIMEsweeper for Lotus Notes and cc: Mail hub version," Jan. 28, 1997, 2 pages.
LexisNexis, "Integralis rolls out smart firewall," Jan. 29, 1996, 2 pages.
LexisNexis, "Reflex Magnetics Counters E-mail Viruses," Jan. 11, 1996, 2 pages.
LexisNexis, "Integralis sets e-mail security standard," Jul. 1, 1996, 2 pages.
LexisNexis, "Integralis Debuts Private Internet Gateway Link, Virus Detection Software," Jul. 5, 1995.
LexisNexis, "Integralis and Enterprise Network Services Team Up to Prevent E-mail Viruses on the Internet; E-mail Virus Scanning Offered for First Time as Option by Internet Service Provider," Jul. 15, 1995, 2 pages.
LexisNexis, "MIMEsweeper charts the waters while probing Web-based threats," Jun. 2, 1997.
LexisNexis, "MimeSweeper neatly cleans up e-mail, Web content; But tricky and entirely manual setup hurts Integralis' software package," Jun. 23, 1997, 3 pages.
LexisNexis, "Integralis Launches the Internet's First Anti-Virus Protection System," Jun. 30, 1995, 2 pages.
LexisNexis, "Integralis E-mail scanner gains Web component," Mar. 3, 1997, 2 pages.
LexisNexis, "Integralis Inc. Announces MIMEsweeper Anti-virus Certification Program; Will test compatibility of major anti-virus products with MIMEsweeper," May 20, 1996, 3 pages.
Kidmail.net webpage. 2012, <http://www.kidmail.net/company.asp>. 2 pages.
Bacchus, Lee. "Language 'Sanitizer' Scans Online Messages." Southam News Edmonton Journal, Final Ed, p. C4, Jun. 29, 1995. 1 page.
"Several Dirty Words That You Can't Say on Prodigy." Hamilton Spectator, Final Edition, Ontario Canada, Jul. 6, 1995, 1 page.
Golding, Andrew R. "A Bayesian hybrid method for context-sensitive spelling correction." technical paper from Mitsubishi Electric Research Labs, Cambridge, MA, 1995, pp. 39-54.
Lewis, Peter H. "Business Technology: No More 'Anything Goes': Cyberspace Gets Censors", New York Times, Jun. 29, 1994. 4 pages.
Safdar, Shabbir J. "Internet Parental Control Frequently Asked Questions (FAQ)" provided by the Voters Telecommunications Watch (VTW). Apr. 7, 1996, 9 pages.
Safdar, Shabbir J. "Internet Parental Control Frequently Asked Questions (FAQ)" provided by the Voters Telecommunications Watch (VTW). 1995, <http://groups.google.com/group/k12.chat.teacher/tree/browse . . . >. 6 pages.
Chislenko, Alexander. "Intelligent Information Filters Enhanced Reality." Apr. 15, 1997. <http://www.lucifer.com/~sasha/EnhancedReality.html>. 7 pages.
Church, Kenneth W. et al. "Commercial Applications of Natural Language Processing." Communications of the ACM, Nov. 1995/vol. 38, No. 11, 9 pages.
"Eudora Light: Version 3.0 for Windows User Manual." Qualcomm, Feb. 1997, 133 pages.
InfoWorld; Apr. 22, 1996; 18, 17; ABI/INFORM Global. pp. 85 and 88.
List of references cited in "Concept Features in Re:Agent, an Intelligent Email Agent." by Gary Boone published in AGENTS '98 Proceedings of the Second International Conference on Automated Agents. ACM. New York, NY 1998. 2 pages.
Helfman, Jonathan Isaac et al."Ishmail: Immediate Identification of Important Information." AT&T Labs Technical Report, 1995.8 pages.
Pantel, Patrick et al. "SpamCop: A Spam Classification & Organization Program." From: AAAI Technical Report WS-98-05. 1998, AAAI (www.aaai.org). 4 pages.
Chang, Shi-Kuo. "A Knowledge-Based Message Management System." ACM Transactions on Office Information Systems, vol. 5, No. 3, Jul. 1987. pp. 213-236.
Motiwalla, Luvai F. et al. "A Knowledge-Based Mail System to Support Managerial Activities." from: System Sciences, 1989. vol. III: Decision Support and Knowledge Based Systems Track, Proceedings of the Twenty-Second Annual Hawaii International Conference on Jan. 3-6, 1989. pp. 650-659.
Chang, Hsi Alex. "An Architecture for Electronic Messaging in Organizations: A Distributed Problem Solving Perspective." Phd dissertation at University of Arizona, Tucson, AZ. 1987. 411 pages.
Cohen, William W. "Learning Rules that Classify E-Mail." From: AAAI Technical Report SS-96-05. 1996, AAAI (www.aaai.org). pp. 18-25.
Sol, Henk G. "Processes and Tools for Decision Support Inferences for Future Developments." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 1-6.
Cecez-Kecmanovic, D. "The Value of Information in Decision-Making." from: "Processes and Tools for Decision Support." Henk G. Sol editor. Proceedings of the Joint IFIP WG 8.3 / IIASA

(56) References Cited

OTHER PUBLICATIONS

Working Conference on Processes and Tools for Decision Support. Schloss Laxenburg, Austria. Jul. 19-21, 1982. pp. 7-24.

Lee, R. M. "Epistemological Aspects of Knowledge-Based Decision Support Systems." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 25-36.

Coelho, H. "PROLOG: A Programming Tool for Logical Domain Modeling ." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 37-45.

Young, L. F. "Computer Support for Creative Decision-Making: Right-Brained DSS." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 47-64.

Bonczek, R. H. et al. "Specification of Modeling and Knowledge in Decision Support Systems." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 65-78.

Bosman, A. "Decision Support Systems, Problem Processing and Co-ordination." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 79-92.

Methlie, L. B. "Organizational Variables Influencing DSS-Implementation." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 93-104.

Fox, M. S. "The Intelligent Management System: An Overview." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 105-130.

Brookes, C. H. P. "Text Processing as a Tool for DSS Design." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 131-138.

Maes, R. et al. "Practical Experiences with the Procedural Decision Modeling System." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 139-154.

Dickson, G. W. "Requisite Functions for a Management Support Facility." from: "Processes and Tools for Decision Support." Henk G. Sol editor. Proceedings of the Joint IFIP WG 8.3 / IIASA Working Conference on Processes and Tools for Decision Support. Schloss Laxenburg, Austria, Jul. 19-21, 1982. pp. 155-164.

Klein, M. et al. "OPTRANS: A Tool for Implementation of Decision Support Centers." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 165-187.

Bergquist, J. W. et al. "Integrated Data Analysis and Management System: An APL-Based Decision Support System." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 189-206.

Humphries, H. "Comparative Analysis of Use of Decision Support Systems in R&D Decisions." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 207-234.

Bohanec H. et al. "An Expert System for Decision Making." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 235-248.

Takkenberg, C. A. Th. "CAP: A Decision Support System for the Planning of Production Levels." from: "Processes and Tools for Decision Support." Henk G. Sol editor. Proceedings of the Joint IFIP WG 8.3 / IIASA Working Conference on Processes and Tools for Decision Support. Schloss Laxenburg, Austria. Jul. 19-21, 1982. pp. 249-259.

Malone, Thomas W. et al. "The Information Lens: An Intelligent System for Information Sharing in Organizations." published in CHI '86 Proceedings of the SIGCHI conference on Human factors in computing systems. ACM. New York, NY, USA. Apr. 1986. p. 1-8.

Cohen, William, W. "Transferring and Retaining Learned Information Filters." published in AAAI'97/IAAI'97 Proceedings of the fourteenth national conference on artificial intelligence and ninth conference on Innovative applications of artificial intelligence. AAAI Press. 1997. 8 pages.

Bernth, Arendse. "EasyEnglish: A Tool for Improving Document Quality." published in ANLC '97 Proceedings of the fifth conference on Applied natural language processing Association for Computational Linguistics. Stroudsburg, PA. 1997. pp. 159-165.

Fung, Pascale et al. "A Technical Word- and Term-Translation Aid Using Noisy Parallel Corpora across Language Groups." published in Machine Translation netWorker Homepagearchive vol. 12 Issue 1/2, 1997. Kluwer Academic Publishers. Hingham, MA. 32 pages.

Swartout, Bill. et al."Toward Distributed Use of Large-Scale Ontologies." USC/Information Sciences Institute Marina del Rey, CA. Sep. 27, 1996. Generated by www.PDFonFly.com at Feb. 15, 2011 2:53:45 AM. URL: http://ksi.cpsc.ucalgary.ca/KAW/KAW96/swartout/Banff_96_final_2.html. 16 pages.

Liddy, Elizabeth D. et al."Text Categorization for Multiple Users Based on Semantic Features from a Machine-Readable Dictionary." ACM TransactIons on Information Systems. vol. 12, No. 3. Jul. 1994. pp. 278-295.

Kay, Martin. "The Proper Place of Men and Machines in Language Translation." technical paper from: Xerox Palo Alto Research Center. Palo Alto, California. Oct. 1980. 21 pages.

Dagan, Ido. et al. "Word Sense Disambiguation Using a Second Language Monolingual Corpus." 1994 Association for Computational Linguistics. pp. 563-596.

Damereau, Fred J. "Evaluating Computer-Generated Domain-Oriented Vocabularies." abstract only which is contained in: Information Processing & Management vol. 26, Issue 6. 1990. 2 pages.

Register, Michael S. et al. "A Hybrid Architecture for Text Classification." Proc. of the 1992 IEEE Int. Conf. on Tools with AI. Arlington, VA. Nov. 1992. pp. 286-292.

Pentheroudakis, Joseph. et al. "Automatically Identifying Morphological Relations in Machine-Readable Dictionaries." Microsoft Research. Redmond, WA. probably published in Proceedings of the Ninth Annual Conference of the UW Centre for the New OED and Text Research.1993. 20 pages.

Vosse, Theo. "Detecting and Correcting Morpho-syntactic Errors in Real Texts." published in ANLC '92 Proceedings of the third conference on Applied natural language processing Association for Computational Linguistics. Stroudsburg, PA.1992. pp. 111-118.

LexisNexis, Mike Avery, "E-mail virus scanner; MIMEsweeper defuses virus network, 'net mail bombs; This genie of virus elimination works magic but is still rough around the edges," May 20, 1996, 4 pages.

Administrator's Guide Version 3.1, http://replay.waybackmachine.org/199801211319361http://www.mimesweeper.integralis.com/downloads/Manua/manual.htm, 1997, 24 pages.

LexisNexis, "Reflex Magnetics Ltd Reflex closes the letterbox on Email viruses," Nov. 27, 1995, 2 pages.

LexisNexis, "Product Integralis Makes E-Mail Anti-Virus Software Available," Oct. 1, 1996, 1 page.

(56) References Cited

OTHER PUBLICATIONS

LexisNexis, Sue Lowe, "Getting the message about viruses," Oct. 1, 1996, 2 pages.
LexisNexis, Jed Bowtell, "A 'filter' for your e-mail; Net Watch," Oct. 1, 1996, 1 page.
LexisNexis, Annmarie Timmins, "MIMEsweeper stops viruses at the front door," Oct. 2, 1995, 2 pages.
LexisNexis, "Government Moves Quickly to Protect E-mail and Slow Proliferation of Macro Viruses; Integralis' MIMEsweeper Adopted by Numerous Government Agencies," Oct. 14, 1996, 2 pages.
LexisNexis, "Integralis Announces New Version of MIMEsweeper for Microsoft Windows NT 4.0; MIMEsweeper v2.4 Increases Performance and Adds NT Services," Oct. 16, 1996, 2 pages.
LexisNexis, Dennis Howlett, "Combat E-mail viruses and spies; Integralis' MIMEsweeper 2.3.2 e-mail content analysis tool," Oct. 30, 1996, 3 pages.
LexisNexis, Dennis Howlett, "Screening your e-mail contents.; Integralis' Mimesweeper e-mail content analysis and quarantining tool; Software Review," Sep. 6, 1995, 3 pages.
LexisNexis, "Internet Security gets Less Costly and Easier to Manage: Integralis Announces MIMEsweeper Compatible with Check Point FireWall-1 on Single NT Server; E-mail virus detection and content management can reside on Firewall server, saving money and support costs," Sep. 16, 1996, 3 pages.
Mimesweeper, "Simplyfing email & web policy enforcement at the gateway," Factsheet, 2007, 2 pages.
Tim Wilson, "E-Mail Eavesdropping—New regulations, software enforce content restrictions," CommunicationsWeek, Manhasset: Apr. 7, 1997, 2 pages.
Lisa Mitchell, "Vigilant software a shield against Internet nasties," The Age (Melbourne, Australia), 3 pages, Oct. 3, 1995.
"Net Nanny Benefits," http://replay.waybackmachine.org/19970607055457/http://www.netnanny.com/product.html, 1997, 8 pages.
LexisNexis, "Microsoft Announces Innovative New E-Mail Management Tool and Ready-to-Use Groupware Applications for Outlook 97; Available for Free Download Now; New E-Mail Rules Wizard and Sample Groupware Applications Provide Sophisticated Collaborative Solutions to Widest Range of Users," Jan. 28, 1997, 3 pages.
Microsoft® Outlook® 97 Administrator's Guide, the Professional Companion to Outlook 97, 1997, 190 pages.
Gio Wiederhold, et al. "A Security Mediator for Health Care Information," Proceedings of the 1996 AMIA Conference, Jul. 25, 1996, 5 pages.
Ellen Spertus, "Smokey: Automatic Recognition of Hostile Messages," Innovative Applications of Artificial Intelligence (IAAI) '97, 1997, 8 pages.
Ellen Spertus, "Filtering the Net," Technology Review; Oct. 1995; 98, 7; 2 pages.
Chinatsu Aone et al., "Assentor: an NLP-based Solution to E-mail Monitoring," From: IAAI-00 Proceedings, 2000, 6 pages.
Carl S. Kaplan, "Big Brother as a Workplace Robot," The New York Times on the Web, Jul. 24, 1997, 5 pages.
LexisNexis, Bill Roberts, "Email Snooping, Required by Law," Oct. 27, 1997, 8 pages.
Paul Thompson et al., "Name Searching and Information Retrieval," http://arxiv.org/html/cmp-lg/9706017, Jun. 19, 1997, 13 pages.
Christy Walker, "SRA Ascends to New Heights With E-Mail Surveillance Ware," PC Week, Sep. 1, 1997, 4 pages.
David Kiesling, "TriBBS Profanity Filter v1.0," http://www.vpdev.com/saltysoft, 1997, 3 pages.
Business Wire, "Novell announces WordPerfect 6.1 for Windows; New version helps users write better and work faster," Nov. 8, 1994, 4 pages.
WorldSecure Server v1.0 Functional Specification, Jul. 24, 1997, 67 pages.
PR Newswire, "ConnectSoft Inc. Releases KidWeb 1.0 and EMail for Kids 3.0," Oct. 14, 1996, 3 pages.

LexisNexis, "ConnectSoft's ConnectSoft E-Mail Connection 3.0," May 20, 1996, 4 pages.
Liddy, Elizabeth et al."Document Filtering Using Semantic Information from a Machine Readable Dictionary." probably from ACL Workshop on Very Large Corpora (1993) 11 pages.
Payne, Terry R. et al. "Interface Agents That Learn an Investigation of Learning Issues in a Mail Agent Interface." Applied Artificial Intelligence, 11:1-32. 1997. 34 pages.
Powers, David M. "Learning and Application of Differential Grammars." In T.M. Ellison (ed.) CoNLL97: Computational Natural Language Learning. ACL.1997. pp. 88-96.
Payne, Terry. "Learning Email Filtering Rules with Magi a Mail Agent Interface." dissertation. Sep. 5, 1994. Department of Computing Science University of Aberdeen King's College. Aberdeen, Scotland. 72 pages.
Somers, Harold L. "Machine Translation and Minority Languages." probably from: Translating and the Computer 19: Papers from the Aslib conference (London). 1997. pp. 1-13.
Kilander, Frederik. "Message Classification and Filtering." Technical report, Department of Computer and Systems Sciences. Stockholm University. Sweden. Jan. 4, 1995. 19 pages.
Taghva, Kazem et al. "Post-Editing through Approximation and Global Correction." technical paper from: Information Science Research Institute. University of Nevada. Las Vegas, NV. Mar. 1993. 12 pages.
Howard, Pamela O. "Prototype Message Dissemination System and Document Routing System for an Army Organization." MS thesis. University of Arizona. Tucson, AZ. May 1990. 87 pages.
Kukich, Karen. "Techniques for Automatically Correcting Words in Text." ACM Computing Surveys, vol. 24, No. 4, Dec. 1992. pp. 377-439.
McGraw, David K. "Sexual Harassment in Cyberspace: The Problem of Unwelcome E-mail." Rutgers Computer. & Technology Law Journal. vol. 21. 1995. pp. 491-518.
Malone, Thomas W. et al. "Toward Intelligent Message Routing Systems." technical paper from: Center for Information Systems Research. Sloan School of Management Massachusetts Institute of Technology. 1985. 13 pages.
Shirey, Robert W. "The Defense Message System." probably published in: ACM SIGCOMM Computer Communication Review. vol. 20, Issue 5. ACM. New York, NY. Oct. 1, 1990. pp. 48-55.
"Web Profanity Killer Developed." Dayton Daily News, Ohio. Dec. 23, 1996. 1 page.
Campbell, Bill. Message regarding "Filtering Outgoing Mail." sent to newsgroup comp.mail.uucp. Sep. 24, 1991. 1 page.
Mailsweeper, The Need for Further Content Control, Source: PDF Document Properties, http://web.archive.org/web/19980121131443/http://www.mimesweepe, Jan. 21, 1998, 1 page.
Mailsweeper, Viruses, Source: PDF Document Properties, http://web.archive.org/web/19980121131443/http://www.mimesweepe, Jan. 21, 1998, 1 page.
Mailsweeper, Junk Email, Source: PDF Document Properties, http://web.archive.org/web/19980121131443/http://www.mimesweepe, Jan. 21, 1998, 1 page.
Mailsweeper, Leakage of Confidential Information, Source: PDF Document Properties, http://web.archive.org/web/19980121131443/http://www.mimesweepe, Jan. 21, 1998, 1 page.
Mailsweeper, Legal Liability, Source: PDF Document Properties, http://web.archive.org/web/19980121131443/http://www.mimesweepe, Jan. 21, 1998, 1 page.
About Content Security, Source: PDF Document Properties Content Security for Email, http://web.archive.org/web/19980121130546/http://www.mimesweepe, Jan. 21, 1998, 2 pages.
MIMEsweeper for FireWall-1 now available!, Source: PDF Document Properties Content Security for Email, http://web.archive.org/web/19980121130546/http://www.mimesweepe, Jan. 21, 1998, 2 pages.
Support for Lotus Notes now Included, Mimesweeper 3.1, Source: PDF Document PropertiesContent Security for Email, http://web.archive.org/web/19980121130546/http://www.mimesweepe, Jan. 21, 1998, 1 page.

(56) References Cited

OTHER PUBLICATIONS

About Content Security, Mimesweeper, Source: PDF Document Properties Content Security for Email, http://web.archive.org/web/19980121130546/http://www.mimesweepe, Jan. 21, 1998, 2 pages.
Mimesweeper, Content Security White Paper, Source: PDF Document Properties Content Security for Email, http://web.archive.org/web/19980121130546/http://www.mimesweepe, Jan. 21, 1998, 14 pages.
MIMEsweeper Case Studies, Source: PDF Document Properties Content Security for Email, http://web.archive.org/web/19980121130546/http://www.mimesweepe, Jan. 21, 1998, 1 page.
Mimesweeper, Product Overview, Source: PDF Document Properties Content Security for Email, http://web.archive.org/web/19980121130546/http://www.mimesweepe, Jan. 21, 1998, 1 page.
*WordCheck* v. *Bit-Defender, et al.*, Case No. 6:10-CV-457-LED Invalidity Claim Chart of U.S. Pat. No. 6,782,510: U.S. Pat. No. 4,456,973, pdf document created Feb. 28, 2012, 17 pages.
*WordCheck* v. *Bit-Defender, et al.*, Case No. 6:10-CV-457-LED Invalidity Claim Chart of Highwatermark Communications Systems Add-On Products Formajorbbs Systems, pdf document created Feb. 28, 2012, 91 pages.
*WordCheck* v. *Bit-Defender, et al.*, Case No. 6:10-CV-457-LED Invalidity Claim Chart of U.S. Pat. No. 6,782,510: MIMEsweeper 2.3, pdf document created Feb. 28, 2012, 320 pages.
*WordCheck* v. *Bit-Defender, et al.*, Case No. 6:10-CV-457-LED Invalidity Claim Chart of U.S. Pat. No. 6,782,510: MIMEsweeper 3.1, pdf document created Feb. 28, 2012, 610 pages.
*WordCheck* v. *Bit-Defender, et al.*, Case No. 6:10-CV-457-LED Invalidity Claim Chart of U.S. Pat. No. 6,782,510:Wordperfect 6.1, pdf document created Feb. 28, 2012, 44 pages.
*WordCheck* v. *Bit-Defender, et al.*, Case No. 6:10-CV-457-LED Invalidity Claim Chart of U.S. Pat. No. 6,782,510: CDA Censor, pdf document created Feb. 28, 2012, 29 pages.
*WordCheck* v. *Bit-Defender, et al.*, Case No. 6:10-CV-457-LED Invalidity Claim Chart of U.S. Pat. No. 6,782,510: Securitymediator for Health Care Information, pdf document created Feb. 28, 2012, 77 pages.
*WordCheck* v. *Bit-Defender, et al.*, Case No. 6:10-CV-457-LED Invalidity Claim Chart of U.S. Pat. No. 6,782,510: Microsoft Outlook 97,pdf document created Feb. 28, 2012, 14 pages.
*WordCheck* v. *Bit-Defender, et al.*, Case No. 6:10-CV-457-LED Invalidity Claim Chart of U.S. Pat. No. 6,782,510: Cybersitter, pdf document created Feb. 28, 2012, 24 pages.
*WordCheck* v. *Bit-Defender, et al.*, Case No. 6:10-CV-457-LED Invalidity Claim Chart of U.S. Pat. No. 6,782,510: Smokey, pdf document created Feb. 28, 2012, 40 pages.
*WordCheck* v. *Bit-Defender, et al.*, Case No. 6:10-CV-457-LED Invalidity Claim Chart of U.S. Pat. No. 6,782,510: Net Nanny, pdf document created Feb. 28, 2012, 24 pages.
*WordCheck* v. *Bit-Defender, et al.*, Case No. 6:10-CV-457-LED Invalidity Claim Chart of U.S. Pat. No. 6,782,510: Assentor, pdf document created Feb. 28, 2012, 178 pages.
*WordCheck* v. *Bit-Defender, et al.*, Case No. 6:10-CV-457-LED Invalidity Claim Chart of U.S. Pat. No. 6,782,510: U.S. Pat. No. 6,609,196 to Dickinson, et al. ("Dickinson"), pdf document created Feb. 28, 2012, 99 pages.
*WordCheck* v. *Bit-Defender, et al.*, Case No. 6:10-CV-457-LED Invalidity Claim Chart of U.S. Pat. No. 6,782,510: Worldsecure Server, pdf document created Feb. 28, 2012, 138 pages.
*WordCheck* v. *Bit-Defender, et al.*, Case No. 6:10-CV-457-LED Invalidity Claim Chart of U.S. Pat. No. 6,782,510: Tribbs Profanity Filter, pdf document created Feb. 28, 2012, 20 pages.

* cited by examiner

WORD CHECKING TOOL FOR SELECTIVELY FILTERING TEXT DOCUMENTS FOR UNDESIRABLE OR INAPPROPRIATE CONTENT AS A FUNCTION OF TARGET AUDIENCE

CROSS REFERENCE TO RELATED APPLICATIONS

The present application claims priority to and is a continuation of Ser. No. 10/919,877 (now U.S. Pat. No. 7,424,674) and Ser. No. 10/723,370, both of which are continuations and claim priority to Ser. No. 09/014,414 filed Jan. 27, 1998 (now U.S. Pat. No. 6,782,510). All of such applications and patents are hereby incorporated by reference as if fully set forth herein.

FIELD OF THE INVENTION

The present invention relates to authoring tools that can be used in connection with contemporary word processing programs. In particular, the present invention provides an author of an electronically drafted document with a word checker that checks for and identifies inappropriate word choices in such document based on a sensitivity scheme of the user=s choosing so that such words may be modified if necessary.

BACKGROUND OF THE INVENTION

The prior art is replete with word processing programs, including a couple of contemporary favorites, Microsoft WORD and Novell's Wordperfect, that are used by a substantial portion of IBM-compatible computer users. These programs are used in known ways for permitting authors to create electronic text (and graphics) documents. As a part of such word processing program, a spell-checking routine is almost always included to help authors reduce the number of unintentional text errors in such documents. A number of prior art patents are directed to this feature, and a reasonable background of the same is described in U.S. Pat. No. 5,604,897 to Travis and U.S. Pat. No. 5,649,222 to Mogilevsky, both of which are hereby incorporated by reference.

It is apparent, however, that spell-checking routines associated with such word processing programs have a number of limitations. Key among these is the fact that they cannot determine whether a particular word choice, while accurately spelled, is nevertheless perhaps inappropriate for the particular context within a particular document. As an example, many words that may be intended by a drafter (such as the words "ask," "suit," "public," etc.) can be transformed into potentially offensive words merely by changing a single letter in such words, transposing a few letters, or by mistakenly adding or dropping a letter. These transformed words, however, will still pass the spell-checking facility, because many of them include even a number of offensive words as part of their standard dictionary. For example, the word "ask" may be inadvertently written as "ass" and unless the message is intended to discuss issues pertaining to certain members of the animal kingdom, it is likely to be an inappropriate word choice. If these inadvertent mistakes are not caught by the drafter during a later review, they will be included in such document and potentially communicated to one or more third parties.

The possibility of such errors is increasing each day because of a number of driving factors, including the fact that standard dictionaries for word processors are growing in size to accommodate the largest number of words of course in a particular language. While one solution may be to not include such words in an electronic dictionary in the first place, this result makes the creation of such dictionaries more complicated because an initial censoring must be done before the words are even translated into electronic form. Moreover, this solution does not help the user to identify inappropriate words that may be skipped over during a spell-checking routine.

Another factor leading to increase in electronic word choice errors is the fact that many electronic documents are never reduced to a physical form before being disseminated. In many instances a glaring error is caught by a human inspection of a printed page before it is sent out. The so-called "paperless office" while improving efficiency and reducing waste also naturally causes a larger number of inadvertent message errors in text documents. Additional errors can even be induced by spell-checkers because when they detect a mis-spelled word, they will often provide a menu of potential word choices as replacements, and it is remarkably easy to select an inappropriate word choice from such menu, again merely by accident. Such errors of course will not be detected because the document is erroneously considered to be "safe" by many users after spell-checking has completed and they will not check it again. In other words, some facility for checking the spell-checker dynamically is also desirable, but does not exist at this time.

There is some facility in the prior art for permitting users to create so-called "exclusion" dictionaries for analyzing text documents. An example of such kind of system is illustrated in U.S. Pat. No. 5,437,036 to Stamps et. al, which is incorporated by reference herein. A drawback of this approach, however, lies in the fact that it requires the user to both divine and manually input all the potential mis-spellings that could occur, and even if they had the time, there are obviously an endless variety that might never be considered by such user. For example, a user may not have the foresight to notice that a simple transposing of two characters (a common error) may generate a word that is extremely offensive. Furthermore Stamps et. al. do not appear to contemplate the possibility that the act of rendering a document "spelling" error free may itself generate unintended word selection errors. As such, therefore, Stamps et. al. is not truly a "word" checker, but, rather, an enhanced spell checker that has been sensitized to a particular user's poor spelling habits. While it incidentally determines whether a word is perhaps not the intended choice of the author (i.e., that the word does not have a particular meaning), it does not perform the important step of determining the precise meaning of the word, and in particular whether the word also has a potentially inappropriate meaning as well.

A few methods for proof-reading electronic documents are also known in the art. A U.S. Pat. No. 4,674,065 to Lange et. al., also incorporated by reference herein, describes a technique for detecting word context errors in a document. This technique seems limited to homophones however (for example, it knows to see if a user intended to use the word "course instead of "coarse") and is not generally applicable to the problem of determining inappropriate use of language in documents. For example, unless a particularly offensive word has a homonym, Lange et. al. would not even detect such word as being a problem. The approach of Lange et. al. further requires a fair amount of computational complexity, since it must analyze the text preceeding and following after a word and use a complicates set of syntax rules to determine whether the word is being used in context correctly. This fact alone makes it essentially unusable for most contemporary word processing programs which utilize background spell checking, dynamic spell-checking, etc.

Finally, a U.S. Pat. No. 4,456,973 to Cargren et al., and also incorporated by reference herein, discusses the use of an electronic word dictionary that has an associated code field for indicating the level of comprehensibility of such word. For example, the word "abandon" is coded with a numerical designation 6, indicating that the word is probably understandable by children at the $6^{th}$ grade level. Cargren et al., however, do not appear to address the more general problem of identifying text that has been inadvertently mis-spelled by an author, and which is likely to be inappropriate. In other words, the Cargren al. approach presumes that the user has correctly input the word in question, and unless the word is coded with a rating below that of the intended grade group of children, it is not flagged in anyway. It is apparent that this method of encoding is fairly impractical for use in an electronic dictionary intended to be used by an adult population, because adults are not classified in this way. In fact, if a target audience of a document is intended to be primarily adults, then the Carlgren et al. approach would not flag any words at all, because they would probably be presumed to be operating at the highest level of education (12), thus rendering this type of filtering essentially useless. In addition, there is no facility mentioned by Cargren et al. for detecting words that are likely to be offensive, even if consciously selected by the author. For example, the use of the word "dame" may be consciously selected but nevertheless undesirable in communications in which the intended audience is primarily adult women. A drafter of an electronic document may desire to be notified of such potentially offensive words if they are known to be sensitive.

SUMMARY OF THE INVENTION

An object of the present invention therefore is to reduce the number of unintentional inappropriate word choices within electronic documents that would otherwise go unnoticed using conventional word processing document checking tools so as to improve the integrity and accuracy of such documents;

Another object of the present invention is to provide a system and method that is easily and seamlessly integratable into conventional word processing document checking tools so as to enhance the performance of such tools;

A related object of the present invention is to provide a system and method for filtering and verifying the contents of one or more electronic documents to determine the presence of potentially inappropriate and unintended word choices;

Yet a further object of the present invention is to reduce the number of intentional but unknowingly inappropriate word choices within electronic documents that would otherwise go unnoticed using conventional word processing document checking tools;

A related object is to improve the performance of present day word processing document checking tools by providing an additional verification tool that confirms the appropriateness of the selections made by such prior art checking tools;

Another object of the present invention is to permit a user of a word processing program to selectively control the level of sensitivity to be used for determining whether words in an electronic document are potentially inappropriate;

Still another object of the present invention is to permit an author of an electronic document to have the words of such document analyzed and processed by a number of context filters of the author's choosing to reduce the number of potential inappropriate words in such document.

These and other objects are achieved by the present invention which includes a word checking software routine (implementable as a stand-alone program or integrated with a conventional spell checker) that checks the meaning of words in an electronic document authored by a user. When word-checking for the document is desired by the user, the words from the document are retrieved one at time, and checked against entries in an electronic dictionary to determine whether they have a particular meaning that has been designated as potentially inappropriate for use in a text document. The determination is made based on comparing a threshold sensitivity level (which can be controlled by the user) with an appropriateness rating found in one or more status fields associated with the word. If the word in question has a rating higher than the threshold set by the user, an alert is provided to indicate such result.

In another embodiment, multiple status fields are used. The status fields can be used essentially as multiple context filters for assisting an author in reducing the number of potentially inappropriate words as they may be conveyed to multiple intended audiences. The ratings for the words in any of the status fields can have any range of values and are preferably coded at the time the words are placed into the electronic dictionary. They can also be modified by the user, later, if desired.

The present invention is completely integratable with a conventional spell-checking program, so that the spelling of a word can also be analyzed before its meaning is also checked. When a mis-spelled word is found, a user can select from a list of accurately spelled substitute words instead, but such substitute word is also checked to see if has a meaning that is potentially inappropriate for use in a text document.

Another variation of the present invention permits a user to specify a set of documents to word-check, and to generate an output indicating the results of such check.

In yet another embodiment, the meaning of the words in the document are checked during an idle state of the word processing program, so that the operation of checking the entire document at the user=s request at a later time can be reduced in time because it will already have been partially completed.

To further reduce errors, another embodiment of the present invention checks the meanings of words substantially immediate in time after they are input into the document by the user. This can ensure that a potential word problem is in fact brought to the user's attention automatically and without the need for a further command from the user.

The electronic dictionary used in the present invention includes a series of records corresponding to words and their associated status field values. The data for these records are input in electronic form to create a set of words in computer readable form for the dictionary, along with status fields associated for each of such words. Again, as mentioned above, the status fields indicate whether such word has a meaning that is potentially inappropriate for use in a particular context. As the dictionary is constituted, any number of status fields can be used to correspond to different sensitivity ratings for different target audiences.

The present invention can be included within a word checking software module that is itself embodied and transferred in computer readable form, such as a floppy disk, a hard disk, a CD-ROM, a magnetic tape, or a non-volatile semiconductor memory. In this way, a new type of computer system is effectuated which permits an author to perform a word checking operation on an electronic text document generated by a conventional word processing program running on such system.

DETAILED DESCRIPTION OF THE INVENTION

Figure 1:
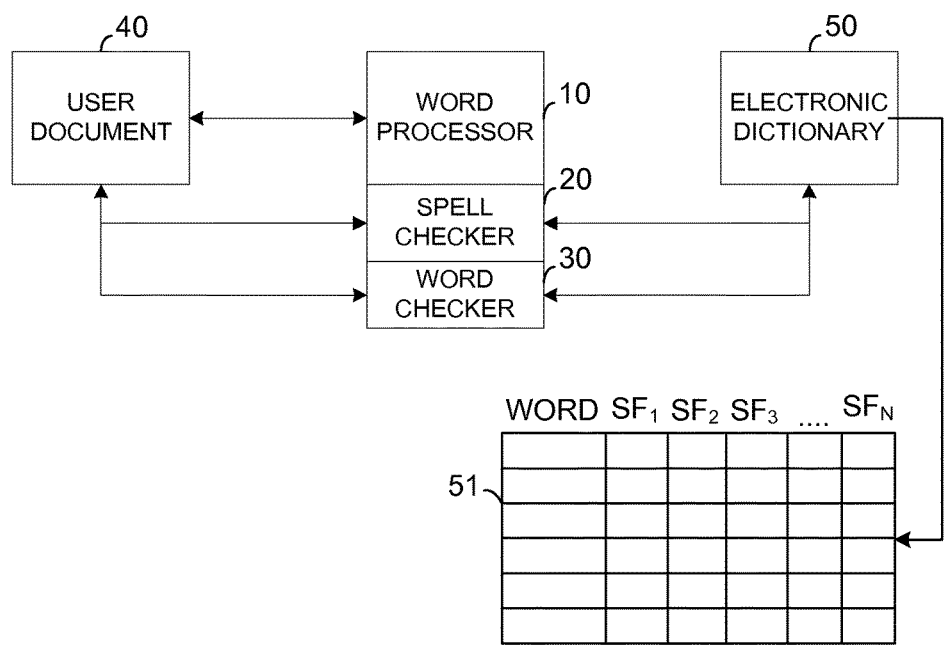
FIG. 1 is a simplified block diagram of a word processing system embodying the teachings of the present invention.

FIG. 1 illustrates a physical implementation of a preferred embodiment of a system employing the present invention. A user can interact with a word processing program 10 loaded in a system memory of a conventional computing system, such as a personal computer. Such programs typically include a spell checking routine or module 20, broken out visually in the present figure for clarification. The inventive routine of the present invention is also illustrated as word checker routine or module 30.

Both spell checking routine 20 and word checker routine 30 have access to and can store/retrieve entries from a standard electronic dictionary 40, which, again, is well-known in the art. In a preferred embodiment, spell checking routine 20 and word checker routine 30 are integrated as a unified module of program 10, but it is understood that they may alternatively be constituted as separate programs that interact with program 10 and each other. Those skilled in the art will appreciate that a number of separate modules (i.e., for controlling printing, document loading, etc.) of program 20 are not shown, but they are not material to the teachings of the present invention. A document 40 is also shown, and this item can be generated and controlled by a user using word processing program 10 in a conventional manner well-known in the art.

Again, while the present illustration depicts the various routines, documents and dictionaries as separate entities, it is understood that this is a simplified description intended to convey the key concepts of the present invention. During normal operation of word processing program 20 these various entities are typically loaded from a non-volatile memory storage device (such as a magnetic hard disk) and then coexist in a physical and logical sense within the same system memory.

Figure 2:
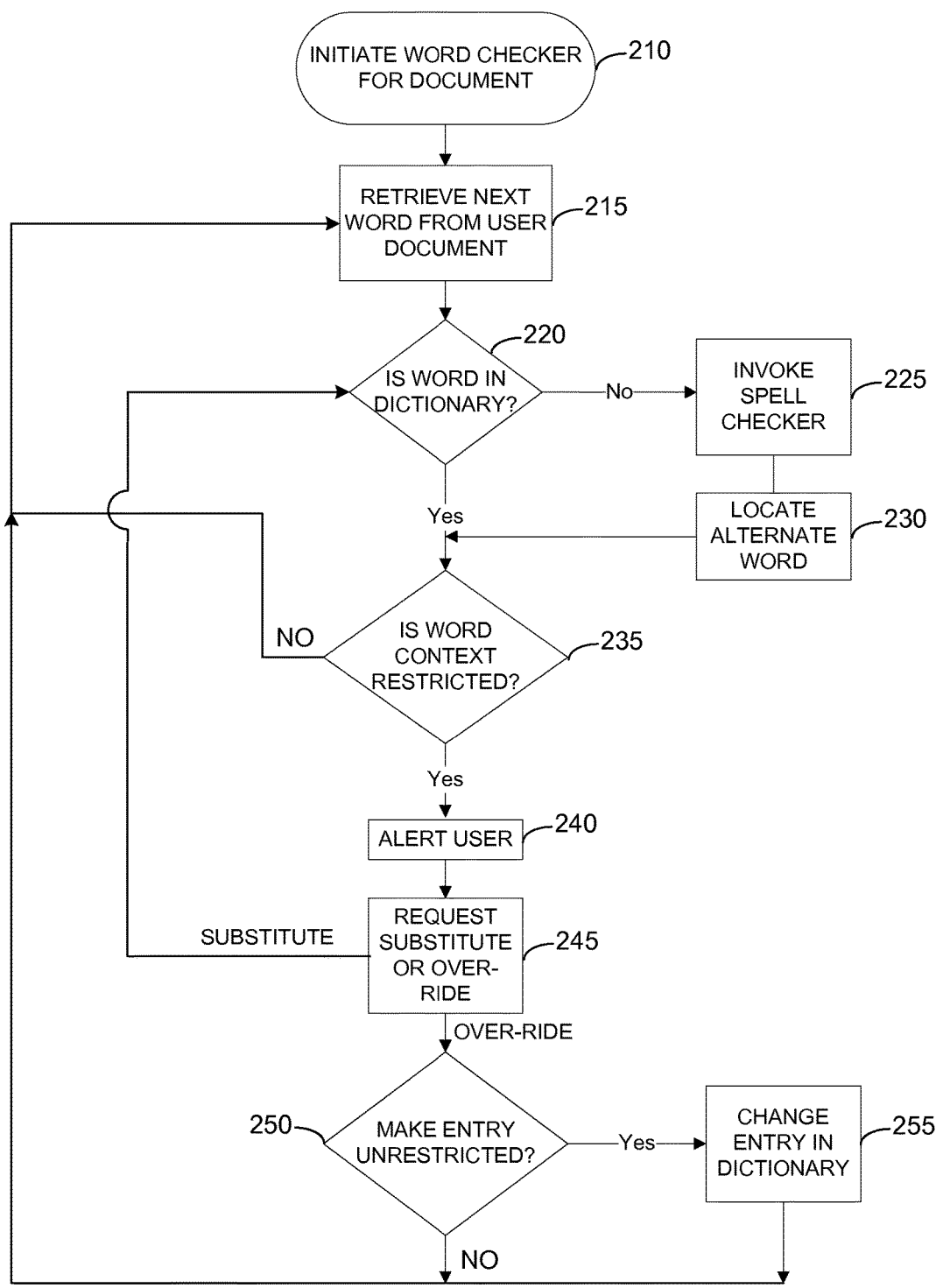
FIG. 2 is a flow chart illustrating the operation of a document word checking tool implemented in accordance with the teachings of the present invention.

A flowchart of the operation of a preferred embodiment of the present invention is depicted in FIG. 2. When word checker routine 30 is invoked at step 210, it begins to retrieve and analyse words from document 10 in a manner well-known in the art from similar techniques used in conventional spell-checkers. In a preferred approach spell checker routine 20 and word checker routine 30 are "integrated" in the sense that they are invoked together and inter-operate with each other. In this variation, the word from the document is first spell-checked in the manner known in the prior art. For example, if the word is not found in electronic dictionary 50 at step 220, spell checker routine 20 is invoked at step 225. Again, using conventional techniques, a set of suitable alternative words are presented to a user at step 230 as replacements for the unidentified word.

At this point the method of the present invention is not different in any material fashion from prior art spelling programs. At step 235, however, a substantial difference is found in the fact that the preferred embodiment of the present invention does not blindly permit the user to select one of the alternatives presented at step 230. As mentioned above, there is a non-insignificant chance of error presented when large lists of words are presented to users during spell-checking routines. It is altogether too easy to select the wrong word, and worse yet, a very inappropriate word. For this reason, at step 235, the word selected by the user is also checked to see if it is flagged as potentially context restricted. In this manner, errors are further reduced, and an additional level of accuracy is achieved.

In a preferred embodiment information concerning a rating of the restricted status for the word can be stored in an electronic field associated with a record for such word in a typical dictionary database which is normally associated with a conventional spell-checking routine. Each entry 51 in dictionary 50 includes a word and one or more associated status fields ($SF_1$, $SF_2$ ... $SF_n$), which, in its simplest form, can be a single bit field that is either set or not set, depending on whether the word has been previously designated as potentially inappropriate. This status bit can be set either during the creation of dictionary 40, or at the request of a user later on, much in the same way new words can be added to auxiliary or supplemental dictionaries used in conventional spell-checking programs.

In a preferred embodiment, status field $SF_1$ can be allocated sufficient coding bits so that it may have any one of N possible values, where N represents a rating indicating a relative ranking of inappropriateness. This feature allows a degree of grading the words of a vocabulary in shades of grey so to speak, and permits more precise control by the user of the level of inappropriateness that can be tolerated within any particular document. For example, using a scale from 1-10, words that are known and commonly used in a vulgar or offensive fashion can be given a 10 value rating, while words that are commonly understood in only harmless contexts can be given a 1 rating. Other words that are not as fixed in meaning or easily classifiable can be given value ratings in between this range, again, depending on their common usage within a particular target audience. Associated status fields $SF_1$, $SF_2$, etc., can be used to generate different and unique sets of inappropriate words for different intended recipient groups. While only three status fields are shown to simplify the present discussion, it is understood that any number may be used in connection with an electronic dictionary. For instance, the ratings found in field $SF_1$ can be based on word meanings for a typical U.S. based English speaking audience, while $SF_2$ might be used to indicate the rating for the same word for a different target audience (i.e., a different language speaking group, a different geographic group within the same country, or an audience with specific sensitivities to certain types of words). The ratings for status fields $SF_1$, $SF_2$, $SF_3$ may be derived from survey results, from polling the intended audience populations, from analyzing other published literature materials for such intended groups, from organizations specializing in advertising and marketing, etc.

One advantage of the present invention over the prior art lies in the fact that the ratings of dictionary words 41 can be pre-programmed, instead of requiring a user to inspect each entry and designate the status manually. It is expected that such ratings could be generated by persons skilled in the art of contemporary language usage, or persons having particular knowledge or understanding of terminology used in specific fields, or by specific target audience groups, using some of the reference materials (e.g. surveys and the like) described immediately above. In a preferred embodiment, the words and associated ratings are put into computer readable form at the time of the creation of the dictionary by the vendor of word processing program 10, or by a supplier of dictionary 50 using a conventional database structure with accessible records or the like.

It is equally feasible, of course, that an entirely separate electronic dictionary 50' may be designated instead for potentially context restricted words. In this kind of approach step 235 merely checks such separate dictionary 50' to see if the word has been included in the class of potentially inappropriate words. In any event, a number of implementations may be employed for designating potentially offensive words and the present invention is not limited to any of the examples shown herein.

In the event the present invention is not embodied in a routine that runs concurrently with spell checker routine 20, it is apparent that steps 220, 235 and 230 would not occur. In other words, in a stand-alone implementation where word checker routine 30 is invoked as another typical word processing tool within document 40, the present routine progresses directly from step 215 to step 235 where the word is checked. The key aspect of the present invention lies in the fact that the meaning or substance of words, not simply the spelling of such words, are determined and verified. In a preferred embodiment, a user of word processing program 10 is able to control both: (1) the range of status fields SF1, SF2, etc. to be checked, as well as (2) a threshold level value for such field that should be used in determining whether a particular word should be flagged. These control mechanisms for the user can take the form of menu choices implemented in well-known fashion in typical contemporary spell-checking programs. In this manner, a particular user document 40 can be subjected to a variety of language "filters" and with varying levels of sensitivity to provide additional functionality and benefits. For example, some U.S. companies doing business in foreign countries nevertheless communicate and advertise in English to the local population, because of the ever increasing English fluency of such countries. Documents intended for such audiences can be subjected to filtering not only for English words that are deemed inappropriate by U.S. citizens, but also which have a negative meaning when transliterated into the language of the country in question. Other users may find it useful to designate one status field simply as a filter for those words that they know are prone to over-use or misuse to increase their writing clarity and proficiency. Accordingly, a user of program 10 can decide to utilize any one or more of such filters in connection with the word checking of document 40, and the selection of such filters can be accomplished in any one of several known ways (i.e., highlighting desired filters presented in the form of a list, specifying them by name, etc.) In addition, the user can also determine (if desired) the threshold level of sensitivity to be used during the checking of words in document 40. In other words, when a particular status field SF1 can have a value ranging from 1 to 10, the user can specifically indicate that only words having a status field value in excess of 8 should be considered as potentially inappropriate.

In one sense, the present invention behaves as a superior spell-checker, because it catches even correctly spelled words that are nonetheless incorrect (from the user's intent perspective) because they are based on other words inadvertently mis-spelled originally by the user. In other words, the user had a word with spelling "xyzzy" in mind, but this word was inadvertently input as "xyyzy." If "xvyzy" (the transformed embodiment of "xyzzy") is nevertheless a word in a spell-checking dictionary, the prior art techniques will never detect this mistake as a true error, even though it is undesirable from the user's perspective, and perhaps worse, may lead to significant embarrassment if undetected. By permitting a user to designate sets of words that should be screened (even if correctly spelled) the present invention affords a significantly higher level of confidence to the user that documents will be generated error and embarrassment free. This kind of tool is especially helpful because of the fact that electronic communications occur in rapid fashion, and dissemination of electronic documents can take place with little chance or opportunity for correcting mistakes.

In any event, should a match occur for the word in question indicating that it falls within the parameters of the user's specification for what should be flagged as an inappropriate word, an alert is given to the user at step 240. In a preferred embodiment, the alert can take the form of highlighting the word in the text of the document with an accompanying warning that can be either visual, audible or both. The alert can also indicate the identity of the filter that was triggered by the word when more than one status field is used during the word checking process. Again, the precise implementation of the warning is not critical, and any one of many known methods in the art can be used.

At this point, the user can decide at step 245 whether the word is truly inappropriate, and if so, the user can provide a substitute word, or override the program to keep the word as is. The substitute word can be provided directly by the user, or a set of suitable alternatives can be presented in the same way conventional spell checking program 20 provides users with such lists. Again, this substitute selection is nevertheless also inspected and verified for its appropriateness by virtue of the fact that the routine branches back to step 220. In this manner, the potential for erroneous inclusion of offensive or inappropriate language is further minimized.

In the event the user decides to stick with the word, an option can be presented to the user at step 250 for reducing the value of the status field for the word so that it will not be identified as a potentially inappropriate word during a subsequent check (unless a lower threshold is used of course). This might be desirable, for example, in certain fields of use where ostensibly inappropriate words may be nevertheless otherwise acceptable for use in common communications. At step 255, therefore, a user can modify the status of the word in dictionary 50 or 50' as the case may be.

Those skilled in the art will appreciate that the present invention can be used in a number of environments where documents are electronically drafted and have electronic text, including with spreadsheet programs, database programs, e-mail programs, etc. Many of these programs have spell-checking capabilities built in, and the present invention can piggy-back directly on such capability.

Figure 3:
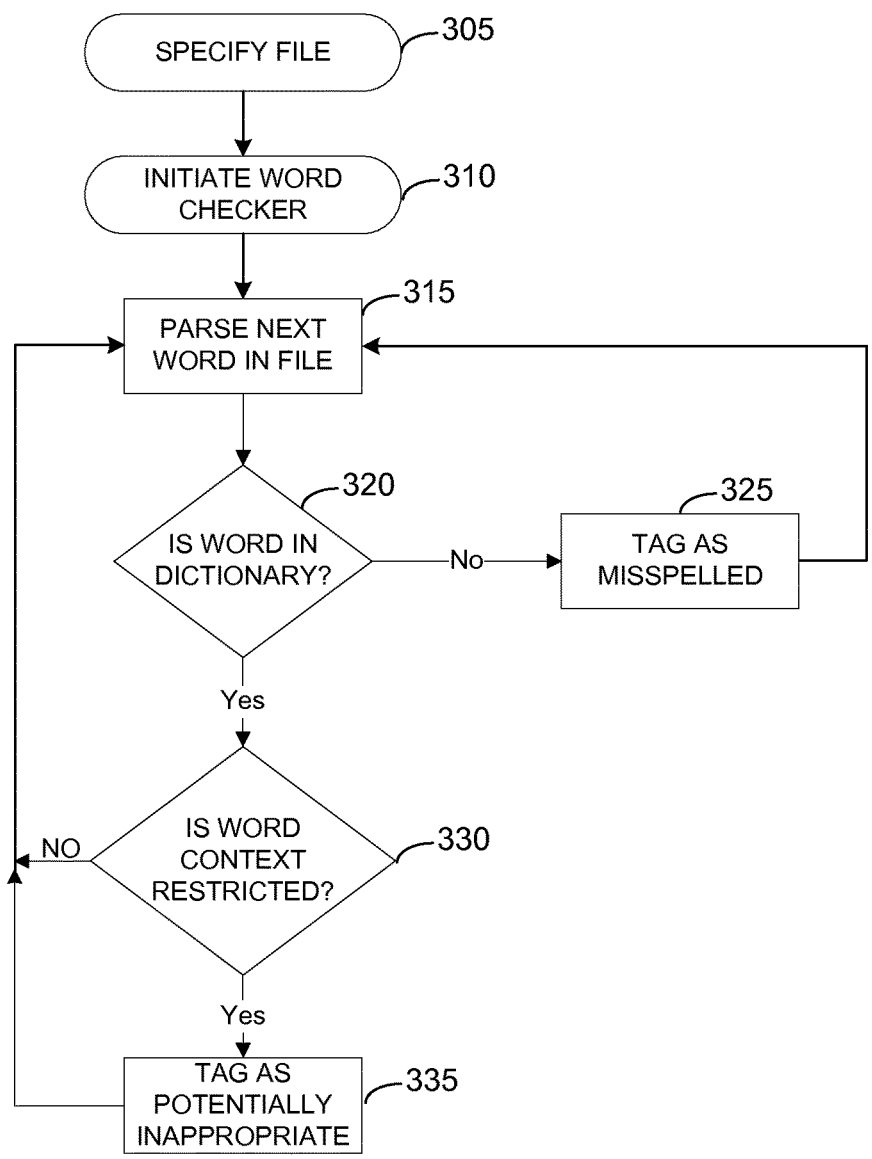
FIG. 3 is a flow chart illustrating a variation of the present invention adapted for checking words in a number of electronic documents specified by a user.

Moreover the present invention can be used for batch inspection and verification of electronic documents, as shown in FIG. 3. Instead of working directly with an open document 40, for example, an electronic file to be word checked can instead be specified at step 305 by a user. This type of capability is common in word-processing programs 10 today, and permits a user to select a number of files that are to undergo a particular operation without opening them. For example, from the FILE OPEN pulldown option in WORDPERFECT, a print operation can be effectuated on a user specified list of files. In this same way, the present invention as embodied in a word checker routine 30 can operate on a number of files at shown at step 310. As each word is parsed at step 315, an optional spell checking routine 320 first determines if there is mis-spelling of such word, and, if so, tags the word as such at step 325. If the word is otherwise identifiable because it is in dictionary 40 or alternate dictionary 40', it is context checked at step 330 in the manner described above and with the same degree of available control by the user. Each word identified as potentially inappropriate is flagged and tagged at step 335 before the routine returns to process the next word. At the end of the file word checking operation, a list of mis-spelled words and identified potentially misappropriate words is generated for the user=s review. This list can be displayed visually, generated as a text file, etc. so the user can determine whether there are potential problems in disseminating such electronic files, and, take corrective action if necessary.

It will be apparent to those skilled in the art that the present invention can be implemented using any one of many known programming languages such as C, C++, Pascal, etc. The details of the specific implementation of the present word checker will vary depending on the programming language used to embody the above principles. Furthermore, while the present discussion has revolved around IBM compatible machines it is equally clear that the present invention is not limited to such environments and can be used with Apple compatible machines, or for that matter with any machine that includes a word processor, including personal digital assistants and similar portable computing devices.

Yet another embodiment of the present invention makes use of a concept disclosed in the Mogilevsky reference discussed above. In this variation, spell checking routine 20 and word checker routine 30 (whether integrated or stand-alone) can be implemented in a well-known fashion that improves performance by having them operate while there is no interaction going on between the user and word processing program 10. In other words, the routine can take advantage of otherwise idle time by checking the document and other open documents if the user is not actively engaged in an operation requiring immediate attention by word processing program 20. It is apparent that such variations of the present invention could be beneficial in a number of environments.

Another useful variation of the present invention can be implemented to take advantage of another well-known concept in the art, and that is the use of "dynamic" text checking. For example, the Travis reference above explains how words can be spell-checked on the fly, i.e., as the user is typing in many conventional word processing programs. This feature permits a user to enter a word, and then have it checked while he or she is still typing, and while their attention is still focused on the document. The spell checking routine 20 automatically substitutes the closest choice it finds for commonly misspelled words; for example, the type word "teh" is changed rapidly to "the" while the user is perhaps still entering text. In a similar vein, a dynamic word-checking feature can be implemented, and t will be apparent to those skilled in the art that this approach is merely a variation of the procedure described in FIG. 2, except that the words retrieved at step 215, are fetched in a background task which is running even while the user is engaged in normal text entry, editing, etc. From the user's perspective, the word-checker routine 30 merely appears as an add-on verification tool feature to spell-checker 20, with additional functionality and benefits for reducing document errors. To minimize errors, the result of the word-check is communicated as quickly as possible to the user, subject to system performance limitations of course. In any event, with typical computing devices it is expected that such result can be communicated before the user has finished completing data entry of another word that must be checked as well. In some application environments it may be desirable to disable further data input once it has been determined that a potentially inappropriate word has just been entered.

One environment where the dynamic variation is especially useful in e-mail systems and electronic fax programs where people rarely spell-check a text message after it is composed. Accordingly, the ability to identify and alert users automatically of potential errors is particularly helpful in this area, and the present invention can be embodied in a memory-resident configuration that interoperates with such e-mail or electronic fax programs to provide this functionality.

In a general sense the present invention can be seen as a useful tool for not only reducing unintentional errors in electronic text documents, but also some intentional errors that are not necessarily understood or appreciated by the user of a word processing program 20. In other words, a word input by a user may be classified by in an number of ways including: (1) an intentional selection that is appropriate; (2) an intentional selection that is inappropriate; (3) an unintentional selection that is inappropriate; or (4) an unintentional selection that is appropriate (in the sense that it is perhaps non-offensive even if it is inapposite for the context). Of these classifications, it is clear that the first category (1) do not require any remedial action. It is equally clear that the category (4) mistakes are perhaps undesirable, but are not easily identifiable, and the computational complexity involved in doing so may not be worthwhile. For example, a sentence that reads "I gave my him jacket" instead of "I gave him my jacket" is not accurate but is not offensive.

The present invention, however, is a simple, fast and cost-effective tool that can be used to easily identify the category (2) and (3) errors above. For the category (3) items, it is a rather simple matter as described above to identify and classify entries in an electronic dictionary with varying status field values reflecting their common usage in a particular context. Any number of potentially offensive, crude, vulgar, obscene or inappropriate words are included in an electronic dictionary for the sake of completeness (and for ease of integration from text to electronic form) but it is rarely the case that they are desired to be used in communication and they can be identified by setting the associated status field to a high value. The category (2) items are somewhat more subtle, but it is apparent that some words, even if consciously selected, may nevertheless be inappropriate because of a number of cultural considerations, or simply because they are generally misused by the general population of authors. As an example, a considerable amount of attention has been focussed recently in the U.S. on eliminating gender specific vocabulary except where absolutely necessary. A business entity attempting to sell products or services to a primarily female based clientele may benefit from a word checking tool that is sensitive to potential gender issues raised by language found in documents intended to be communicated to such clientele to reduce the possibility of an mis-communication. Many ethnic groups have particular words or phrases that are considered inappropriate or offensive by them, even if they otherwise understood as inoffensive by other groups. For example, Chevrolet automobiles designated "Nova" did not sell well in Latin American countries, because the term as translated into Spanish means "does not go." In addition, many foreigners attempting to write in English often confuse homonyms and substitute the wrong word choice (for example, weather and whether). Similar examples from other fields will be apparent to those skilled in the art. For any such areas, it would be an easy task for a person skilled in the field of contemporary language and familiar with such potentially offensive vocabulary in such specific area to flag such entries in electronic dictionary 50 by using one of the associated status fields (SF1, SF2, SFn, etc.), and/or to assemble and create a separate customized electronic dictionary of words that potentially implicate inappropriate language for a particular audience. These dictionaries could supplement traditional electronic dictionary 50 and be invoked as needed by a user of word processing program 10, so that any one or more of a number of word checking verifications or document filtrations could be performed depending on the target audience intended to receive such document. Such additional dictionaries, or additional status field values for a particular filter, could be created in a number of ways, including as additional incorporations in the original dictionary 50, or by the vendor or user of computer program 10 modifying dictionary 50 at a later time.

Finally, word processing program 10, spell-checking program 20 and word-checking program 30 described above can be embodied in well-known ways in an article of manufacture such as in traditional computer-readable media commonly used to transport such programs. These can include a floppy disk, tape, hard disk, CD-ROM or equivalent non-volatile storage system. In this format, they can be transported easily and loaded via a host computer into system memory for execution. Alternatively in smaller, self-contained environments, such as personal digital assistants, the above routines can be implemented as part of a non-volatile storage portion of a stand-alone integrated circuit, or embedded as part of a non-volatile storage structure in an architecture of a typical microprocessor or RISC processor. The instructions for carrying out such routines can be encoded or implemented in a silicon substrate as is done with other program ROMs, and using conventional manufacturing techniques.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the appended claims.

What is claimed is:

1. A method of checking electronic text document files containing descriptions of products and/or services on a computing system comprising:
    defining a plurality of separate target audiences for the electronic text document files using the computing system;
    wherein said plurality of separate target audiences are associated with a plurality of separate associated undesirable content vocabularies;
    receiving a plurality of electronic text document files designated to be communicated to said plurality of separate target audiences including a plurality of identified intended recipients;
    wherein at least two of said plurality of intended recipients are from different ones of said plurality of separate target audiences;
    providing at least one first electronic filter containing a first set of words corresponding to a first one of said separate associated undesirable content vocabularies for a first target audience;
    providing at least one second electronic filter containing a second set of words corresponding to a second one of said separate associated undesirable content vocabularies for a second target audience;
    wherein said first set of words and said second set of words are designated as offensive and/or inappropriate for communication with a corresponding designated first or second target audience respectively for the products and/or services;
    checking said plurality of electronic text document files for inappropriate content concerning the products and/or services with the computing system using said first and/or second electronic filter prior to initially distributing said plurality of electronic text document files to any designated identified intended recipients;
    wherein said first and second electronic filters can be invoked selectively by an operator of the computing system on a document-by-document basis, such that a first content in a first electronic text document file is not processed with said electronic filters, and a second content in a second electronic text document file is processed based on both said first electronic filter and said second electronic filters;
    controlling distribution of said plurality of electronic text document files to corresponding designated target audiences and said plurality of identified intended recipients with the computing system based on checking content with said electronic filters.

2. The method of claim 1, wherein said electronic filters include at least one customizable filter which can be changed by a business entity selling said products and/or services to include additional words inappropriate for a target audience.

3. The method of claim 1, wherein said electronic filters include at least one customizable filter containing gender specific inappropriate words.

4. The method of claim 1, wherein said electronic filters include at least one customizable filter containing inappropriate racist words.

5. The method of claim 1, further including a step: providing an alert with the computing system when an electronic text document contains one or more words within one or more of said electronic filters.

6. The method of claim 1, wherein said electronic filters include inappropriate foreign words.

7. The method of claim 1, wherein said electronic text documents include emails or faxes.

8. The method of claim 1, wherein said electronic text documents are advertising and/or marketing materials.

9. The method of claim 1 wherein said distribution can be controlled on a recipient by recipient basis.

10. The method of claim 1 wherein said plurality of electronic text document files are processed as a batch of files.

11. The method of claim 10 wherein a text report file is generated for said batch of files, identifying a list of any potentially inappropriate words found in each of said electronic text document files.

12. The method of claim 1 wherein a first rating for a first word in said first electronic filter is different than a second rating for said first word in said second filter.

13. The method of claim 1, wherein said operator can specify a threshold level of sensitivity to be used during the checking of words in said electronic text document files.

14. A method of checking a plurality of electronic text document files containing descriptions of products and/or services on a computing system comprising:
defining a plurality of separate target audiences for the electronic text document files using the computing system;
wherein said plurality of separate target audiences are associated with a plurality of separate sets of associated filter words;
receiving a plurality of electronic text document files designated to be communicated to said plurality of separate target audiences including a plurality of identified intended recipients;
wherein at least two of said plurality of intended recipients are from different ones of said plurality of separate target audiences;
providing a plurality of separate electronic filters, each one of said plurality of electronic filters containing a set of filter words which are designated as offensive and/or inappropriate for communication with a corresponding designated target audience for a corresponding product and/or service;
wherein said plurality of separate electronic filters are associated with said plurality of separate target audiences and a plurality of products and/or services;
checking said plurality of electronic document files for inappropriate content concerning each of the plurality of products and/or services with the computing system as needed based on a corresponding electronic filter prior to initially distributing said plurality of electronic text document files to any designated identified intended recipients;
wherein said plurality of electronic filters can be invoked selectively and on a document by document basis and such that a first content in a first electronic text document file is processed only with a first electronic filter, and a second content in a second electronic text document file is processed only with a second electronic filter;
presenting selected ones of said electronic text documents concerning a product and/or service to a member of a designated target audience as an identified intended recipient based on checking said plurality of electronic filters.

15. The method of claim 14 wherein said plurality of electronic text document files are processed as a batch of files.

16. The method of claim 15 wherein a text report file is generated for said batch of files, identifying a list of any potentially inappropriate words found in each of said electronic text document files.

17. The method of claim 14 wherein a first rating for a first word in said first electronic filter is different than a second rating for said first word in said second filter.

18. The method of claim 14, wherein said operator can specify a threshold level of sensitivity to be used during the checking of words in said electronic text document files.

* * * * *